United States Patent Office.

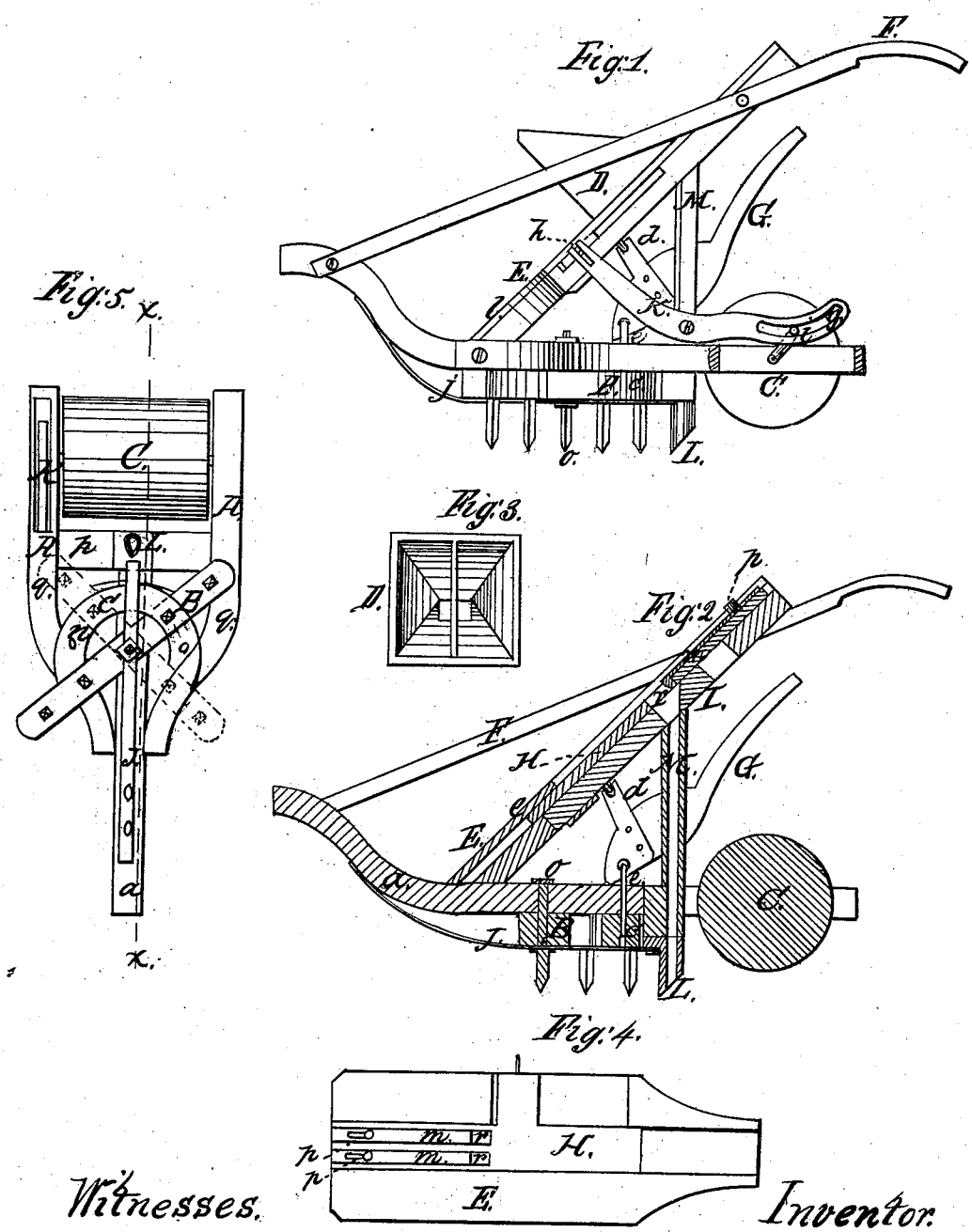

F. J. ASHBURN, OF WEST UNION, WEST VIRGINIA.

Letters Patent No. 85,721, dated January 12, 1869.

IMPROVEMENT IN CORN-PLANTERS.

The Schedule referred to in these Letters Patent and making part of the same.

*To all whom it may concern:*

Be it known that I, F. J. ASHBURN, of West Union, in the county of Doddridge, and State of West Virginia, have invented certain new and useful Improvements in Corn-Planters; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

This invention relates to automatic corn-planters, and consists in a peculiar combination of parts, whereby two kinds of seed, as corn and beans, or corn and pumpkin-seed, may be deposited in the same hill; and also in a novel method of attaching a harrow, so that it will thoroughly pulverize the earth, and remove all sticks, stones, clods, &c., from it, leaving it ready to receive the seed, which is deposited through a drill-tooth following immediately in the rear of said harrow.

In the drawings—

Figure 1 is a side elevation of my planter.

Figure 2, a longitudinal vertical section on the line x-x.

Figure 3, a view of the seed-hopper detached.

Figure 4, a view of the bed upon which the seed-slide plays, detached.

Figure 5, a bottom plan view.

My machine consists of a frame, A, formed of the central beam a, the side-pieces g, and cross-bar, p, all framed together as shown in fig. 5, the end of the piece a extending some distance forward of the remainder of the frame, and being curved upward, as seen in figs. 1 and 2, thus forming the beam or tongue of the machine, to which the horse is attached, the rear end of this beam extending back to and being tenoned into the cross-bar p.

To the upper side of this frame A is secured the flat bed or table E, nearly as wide as the machine, and standing at an angle of from thirty degrees to forty-five degrees to the frame, and being supported at the rear end by an upright resting on the upper side of cross-bar p, as shown in fig. 1.

This table E, I provide with two slides, H and I, the slide H being the seed-slide for conveying the seed from the hopper D to the upper end of the tube M, through which the seed drops into and through the drill-tooth L, into the furrow made by the said tooth, the other slide I being for the purpose of preventing the flow of seed when it is not desired to plant, as when turning the machine around at the end of the field.

In the rear end of the frame A, back of the drill-tooth, is mounted a roller, C, which serves the two-fold purpose of supporting the rear end of the machine and regulating the depth to which the drill-tooth shall enter the ground, and of covering the seed deposited in the furrow through it.

One of the journals of this roller has secured to it a crank, i, as shown in figs. 1 and 5, this crank playing in a curved slot, g, in the lower end of the bent lever K, which lever is pivoted near its middle to the standard which supports the table E, and is forked at its upper end to receive the pin h on the side of the seed-slide H, so that, as the roller C is revolved, the crank i will cause the lever K to vibrate and give to the seed-slide H a reciprocating motion upon the table E.

The seed-slide H is provided with two openings, r, the size of which may be varied by adjusting the slides m, which are slotted and provided with the set-screws p, as shown in fig. 4, these openings r being for the purpose of receiving the grain from the seed-hopper D, and conveying it to the tube M at the centre of the machine, and connected with the drill-tooth L.

The hopper D is provided with a partition through the middle, in a line running lengthwise of the machine, and which divides the hopper into two divisions or compartments, one of which is intended to contain the corn, and the other, the beans and pumpkin or other seed to be planted with it.

The hopper has two openings in its bottom, one in each compartment, and the hopper is so situated on the machine that when the slide is at the extreme limit of its downward movement, the openings r in it shall be directly under the openings in the hopper, one under each compartment of the hopper, and when the slide is at the end of its upward movement, the openings r are brought directly over the upper end of the tube M.

On the under side of the frame A, in front of the drill-tooth, is secured a harrow, B, consisting of a straight bar, armed with drag-teeth, and being pivoted on the middle tooth, which passes up through the bar a, and is secured by a nut on its upper end, the tooth being braced also by a metal strap, J, secured to the drill-tooth, and extending forward, and being secured to the front end of frame A.

The harrow, thus constructed, may be turned upon its pivot so as to stand diagonally across the frame in either direction, so as to carry the clods, sticks, stones, &c., to either side, as desired.

To hold this harrow in position after being adjusted, there is attached to it, on the rear side, a semicircular piece, c, as shown in figs. 1, 2, and 5, which is provided with holes, n, and to the inner end of the lever G is attached a pin or bolt, e, which passes down through the beam a, and when the holes n are brought beneath it, this bolt may be shoved down into them by raising lever G, thus locking the harrow in position.

By throwing the lever G down, this bolt is raised and the harrow unlocked, when it may be swung around and locked in the opposite position.

The lever G has an upwardly-extending arm, d, which is forked to receive a stud secured to the under side of the slide I, so that when the lever G is raised to unlock the harrow, it will, at the same time, shut off the flow of seed from the hopper.

The machine is provided with handles, F, similar to those of a plow, for the purpose of guiding and handling it.

When thus constructed and arranged, the machine operates as follows:

The corn is placed in one side of the hopper, and the other seed to be planted in the opposite side, the machine brought to the spot where the planting is to begin, the harrow adjusted, and the lever G raised, locking the harrow, and opening the tube for the flow of seed. The machine is then drawn across the field, when it will "drop" once at each revolution of the roller.

When the end of the field is reached, the handle G is thrown down, shutting off the flow of seed, and releasing the harrow. The machine is then turned around and the harrow locked in the opposite position to that in which it stood during the previous passage across, thus always throwing the rubbish to the same side of the furrow.

It is obvious that any desired number of holes $n$ may be made in the harrow, and thus allow it to be locked at any angle across the frame.

The crank $i$ and the lever K are shown as playing in an opening or slot through the side-piece of the frame, but it is evident that they may either do this or be placed outside of the frame, the only object of the arrangement shown being to prevent their catching in the rubbish or brush that might accidentally come in contact with them.

The slot $g$ is so curved that the slide shall remain stationary for an instant when at the end of the "up"-stroke, so as to insure the discharge of all the seed from it into the pipe M.

A machine of this construction possesses many advantages not incident to others, among which are its adaptability to any kind of soil, the simplicity and efficiency of the mechanism, and the harrow so arranged that it will always throw the stones, &c., to the same side of the furrow, and the slides, being all covered by the board or covering $l$, are protected from injury by dirt or stones falling on the machine. And not only may two kinds of seed be planted in one hill, but their relative quantities varied at will.

Having thus described my invention,

What I claim, is—

1. In combination with a seed-planter, the reversible harrow B and lever G, when constructed and arranged to operate substantially as described, and for the purpose set forth.

2. The hopper D, plate E, slide H, and lever K, when constructed and arranged to operate substantially as described, in combination with the covering-roller C, for the purpose set forth.

3. In combination with the hopper D and drill-tooth L, the plate E, with its slides H and I, when constructed and arranged to operate substantially as described.

F. J. ASHBURN.

Witnesses:
JOSEPH CHENORONT,
JOHN DYE.